United States Patent
Sato (10) Patent No.: US 11,837,226 B2
(45) Date of Patent: Dec. 5, 2023

(54) INFORMATION PROCESSING APPARATUS, INFORMATION PROCESSING METHOD, ELECTRONIC DEVICE AND INFORMATION PROCESSING SYSTEM

(71) Applicant: BROTHER KOGYO KABUSHIKI KAISHA, Nagoya (JP)

(72) Inventor: Ryoichi Sato, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 269 days.

(21) Appl. No.: 17/210,433

(22) Filed: Mar. 23, 2021

(65) Prior Publication Data
US 2021/0304753 A1 Sep. 30, 2021

(30) Foreign Application Priority Data
Mar. 31, 2020 (JP) .................................. 2020-063725

(51) Int. Cl.
*G10L 17/24* (2013.01)
*G06F 3/16* (2006.01)
(Continued)

(52) U.S. Cl.
CPC .............. *G10L 15/22* (2013.01); *G06F 3/167* (2013.01); *G10L 2015/223* (2013.01)

(58) Field of Classification Search
USPC ......... 358/1.1–3.29, 1.11–1.18; 700/94–117; 704/1–275; 707/758–812; 706/1–56;
(Continued)

(56) References Cited

U.S. PATENT DOCUMENTS 10,943,470 B2 * 3/2021 Lee ..................... H04L 12/2818
2014/0344434 A1 * 11/2014 Ishihara ................ H04L 12/281
709/223

(Continued)

FOREIGN PATENT DOCUMENTS

JP 2020-500330 A 1/2020
WO 2018/085671 A1 5/2018

OTHER PUBLICATIONS

JP2018063537, Kawachi Reiko, Home Network, Electronic Apparatus, Processing Device and Display Method; Apr. 19, 2018 (Year: 2018).*

(Continued)

*Primary Examiner* — Marcellus J Augustin
(74) *Attorney, Agent, or Firm* — KENEALY VAIDYA LLP (57) ABSTRACT

An information processing apparatus includes: a voice input/output interface; a communication interface, the information processing apparatus being connectable to a microphone and a speaker via the voice input/output interface; and a controller configured to: receive a user's instruction for registering a nickname on an electronic device; specify the electronic device on which the nickname is to be registered; register the nickname on the specified electronic device through communicating with the specified electronic device via the communication interface; recognize a content of a voice instruction from an utterer's pronunciation received by the microphone; and in a case the recognized content of the voice instruction includes the registered nickname, cause the electronic device corresponding to the registered nickname to perform an operation corresponding to the recognized voice instruction.

13 Claims, 6 Drawing Sheets

(51) Int. Cl.
*H04L 61/30* (2022.01)
*H04L 61/3015* (2022.01)
*G10L 15/22* (2006.01)

(58) Field of Classification Search
USPC ........................................................ 901/1–46
See application file for complete search history.

(56) References Cited

U.S. PATENT DOCUMENTS

2017/0070478 A1* 3/2017 Park ..................... H04L 67/12
2022/0338281 A1* 10/2022 Kwon .................... H04L 12/28

OTHER PUBLICATIONS

JP2018011270, Sakurai Toshiyuki; Apparatus Control Device, Apparatus Control System, Apparatus Control Method, and Program, Jan. 18, 2018 (Year: 2018).*
JP2002152816, Otsuki Shinya, Wireless Communication System, May 24, 2002 (Year: 2002).*

* cited by examiner

INFORMATION PROCESSING APPARATUS, INFORMATION PROCESSING METHOD, ELECTRONIC DEVICE AND INFORMATION PROCESSING SYSTEM

CROSS-REFERENCE TO RELATED APPLICATIONS

This application is based on and claims priority under 35 USC 119 from Japanese Patent Application No. 2020-063725 filed on Mar. 31, 2020, the contents of which are incorporated herein by reference.

TECHNICAL FIELD

The present disclosure relates to technology of controlling a device by voice.

BACKGROUND

A related art discloses a configuration where a nickname can be assigned to a device connected to a smart speaker via a LAN, and when a user instructs an operation by calling the smart speaker with a nickname, the smart speaker instructs the device with the called nickname to perform the instructed operation.

SUMMARY

One illustrative aspect of the present disclosure may provide an information processing apparatus including: a voice input/output interface; a communication interface, the information processing apparatus being connectable to a microphone and a speaker via the voice input/output interface; and a controller configured to: receive a user's instruction for registering a nickname on an electronic device; specify the electronic device on which the nickname is to be registered; register the nickname on the specified electronic device through communicating with the specified electronic device via the communication interface; recognize a content of a voice instruction from an utterer's pronunciation received by the microphone; and in a case the recognized content of the voice instruction includes the registered nickname, cause the electronic device corresponding to the registered nickname to perform an operation corresponding to the recognized voice instruction.

According to the present disclosure, it is possible to exclude a troublesome operation and to make it easy to assign the same nickname to the same device and to instruct an operation with the plurality of types of smart speakers.

BRIEF DESCRIPTION OF DRAWINGS

Illustrative embodiments of the disclosure will be described in detail based on the following figures, wherein.

DETAILED DESCRIPTION

In the above-described related art, the association of the nickname and the device is performed only inside of the smart speaker. Therefore, when the user wants to assign the same nickname to the same device and to instruct an operation with a plurality of types of smart speakers, the user should register the same nickname on the same device, which is troublesome.

Therefore, one aspect of the present disclosure provides technology that can exclude a troublesome operation and makes it easy to assign the same nickname to the same device and to instruct an operation with a plurality of types of smart speakers.

Hereinbelow, an illustrative embodiment of the present disclosure will be described in detail with reference to the drawings.

Figure 1:
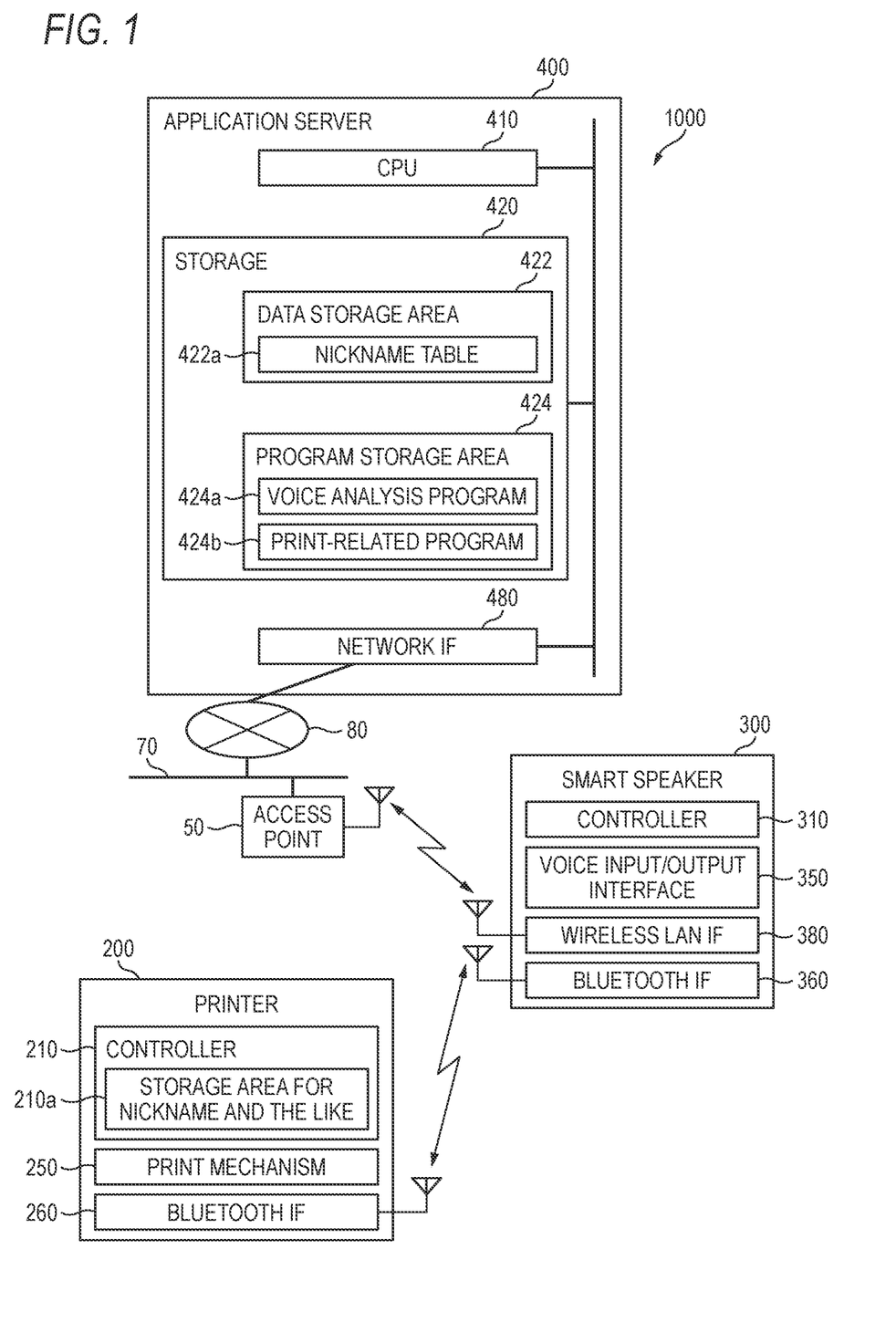
FIG. 1 is a block diagram depicting a configuration of an image forming system in accordance with an illustrative embodiment of the present disclosure.

FIG. 1 depicts a configuration of an image forming system 1000 in accordance with an illustrative embodiment of the present disclosure. The image forming system 1000 is mainly configured by a printer 200, a smart speaker 300, and an application server 400. Note that, in the image forming system 1000 of the present illustrative embodiment, the printer 200 and the smart speaker 300 are used by the same user.

An access point 50 that is used in the image forming system 1000 is configured to implement a function as an access point of a wireless LAN (abbreviation of Local Area Network) by using a communication method according to IEEE 802.11a/b/g/n standards, for example. The access point 50 is connected to a LAN 70. The LAN 70 is a wired network established in conformity to Ethernet (registered trademark), for example. The LAN 70 is connected to the Internet 80. The application server 400 is connected to the Internet 80.

The printer 200 includes a controller 210 including a CPU (abbreviation of Central Processing Unit) and a memory, a print mechanism 250 configured to perform printing according to control of the controller 210, and a Bluetooth IF (abbreviation of Interface) 260, for example. The memory included in the controller 210 is provided with a storage area 210*a* for a nickname and the like. In the storage area 210*a* for a nickname and the like, a nickname assigned to the printer 200, device specifying information for specifying the printer 200, and the like are stored. The print mechanism 250 is a mechanism configured to print an image on a sheet, and is a print mechanism of an electrophotographic method, an inkjet method, a thermal method or the like. The Bluetooth IF 260 is an interface that includes an antenna and is configured to perform short-range wireless communication in conformity to the Bluetooth method, and is used for communication with the smart speaker 300.

The smart speaker 300 is a device configured to execute specifying processing, in response to voice uttered by a user. The specifying processing includes, for example, processing of generating and transmitting voice data to the application server 400. The smart speaker 300 includes a controller 310 including a CPU and a memory, a voice input/output interface 350, a Bluetooth IF 360, and a wireless LAN IF 380.

The voice input/output interface 350 includes a speaker and a microphone, and is configured to execute processing relating to an input of voice and an output of voice. For example, the voice input/output interface 350 is configured to detect voice uttered by the user and to generate voice data indicative of the voice, under control of the controller 310. The voice input/output interface 350 is configured to generate voice corresponding to the received voice data, from the speaker.

The wireless LAN IF 380 includes an antenna and is configured to perform wireless communication by using a communication method according to IEEE 802.11a/b/g/n standards, for example. Thereby, the smart speaker 300 is connected to the LAN 70 and the Internet 80 via the access point 50, and is communicatively connected to the application server 400.

The Bluetooth IF 360 is an interface that includes an antenna and is configured to perform short-range wireless communication in conformity to the Bluetooth method, and is used for communication with the printer 200. Thereby, the printer 200 is communicatively connected to the application server 400 via the Bluetooth IF 260, the Bluetooth IF 360 of the smart speaker 300, the wireless LAN IF 380 of the smart speaker 300, the access point 50, the LAN 70 and the Internet 80.

The application server 400 is, for example, a server that is operated by a business operator that provides a so-called cloud service. The application server 400 includes a CPU 410 configured to control the entire application server 400, and a storage 420 including a ROM (abbreviation of Read Only Memory), a RAM (abbreviation of Random Access Memory), an HDD (abbreviation of Hard Disk Drive), an SSD (abbreviation of Solid State Drive), an optical disk drive, and the like. The application server 400 further includes a network IF 480 for connection to the Internet 80. Note that, although the application server 400 is conceptually shown as one server, the application server 400 may also be a so-called cloud server including a plurality of servers communicatively connected to each other.

The storage 420 includes a data storage area 422 and a program storage area 424. The data storage area 422 is a storage area in which data necessary for the CPU 410 to execute processing, and the like are stored, and functions as a buffer area in which a variety of intermediate data, which are generated when the CPU 410 executes processing, are temporarily stored. In the data storage area 422, a nickname table 422a is also stored. The program storage area 424 is an area in which an OS (abbreviation of Operating System), an information processing program, a variety of other applications, firmware and the like are stored. The information processing program includes a voice analysis program 424a and a print-related program 424b. The voice analysis program 424a is uploaded and provided to the application server 400 by an operator of the application server 400, for example. The print-related program 424b is uploaded and provided to the application server 400 by a business operator that provides a print service by using resources of the application server 400, for example, a business operator that manufactures the printer 200, for example. Note that, all or some of the voice analysis program 424a may also be provided by the business operator that manufactures the printer 200, for example. Alternatively, all or some of the print-related program 424b may also be provided by the business operator that operates the application server 400.

The application server 400, particularly, the CPU 410 is configured to function as a voice analysis processor 424a' (refer to FIG. 2) by executing the voice analysis program 424a. The voice analysis processor 424a' is configured to execute voice recognition processing and morpheme analysis processing. The voice recognition processing is processing of analyzing voice data to generate text data indicative of a content of utterance indicated by the voice data. The morpheme analysis processing is processing of analyzing the text data to extract structural units (called morphemes) of words included in the content of utterance and to specify types of the extracted morphemes (for example, types of parts of speech).

The application server 400, particularly, the CPU 410 is also configured to function as a print-related processor 424b' (refer to FIG. 2) by executing the print-related program 424b. The print-related processor 424b' is configured to execute processing of generating a command for instructing the printer 200 to operate by using the text data obtained as a result of the analysis of the voice data, for example.

Figure 2:
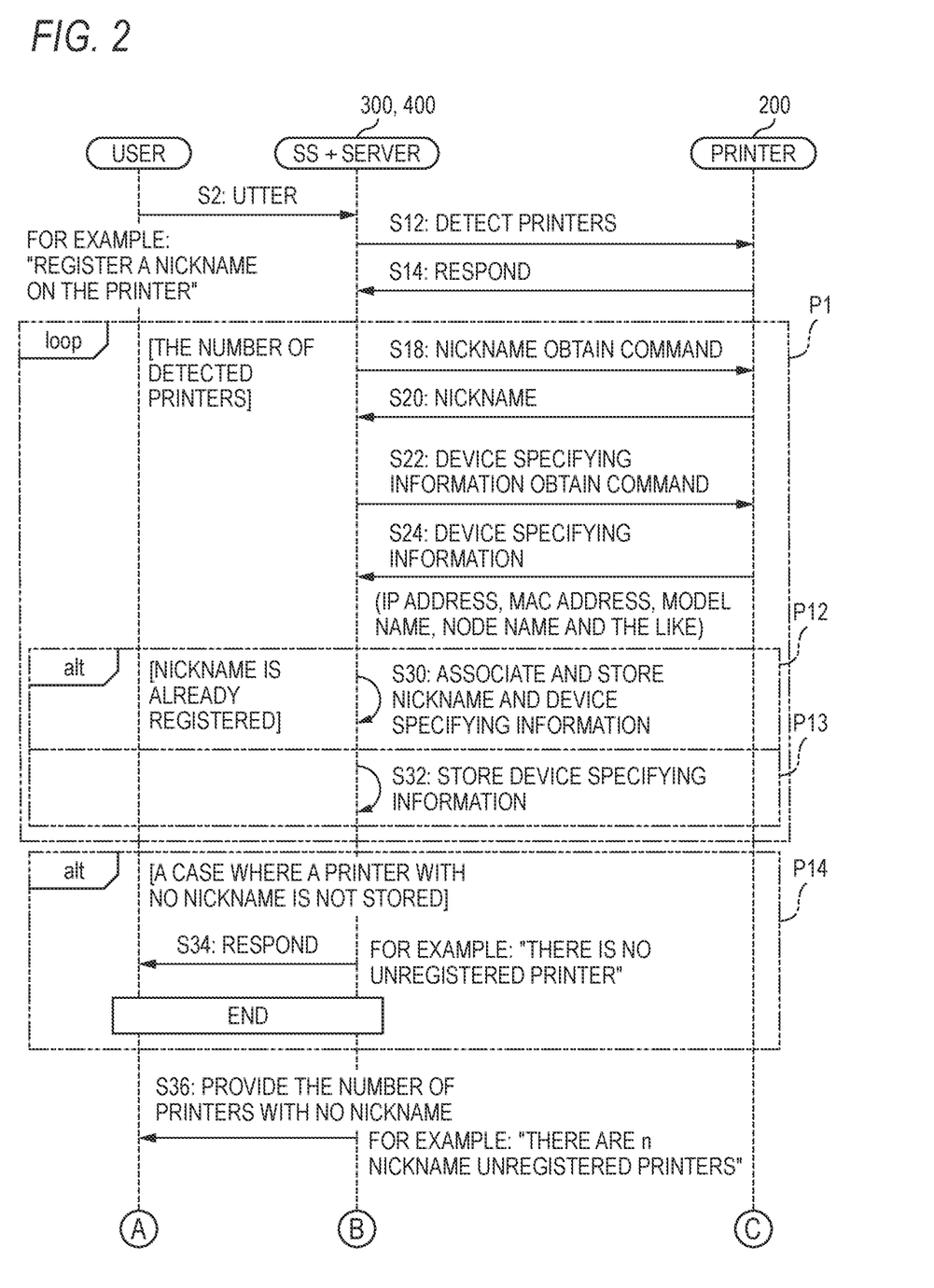
FIG. 2 is a sequence diagram of nickname registering processing that is executed by the image forming system shown in FIG. 1.
Figure 3:
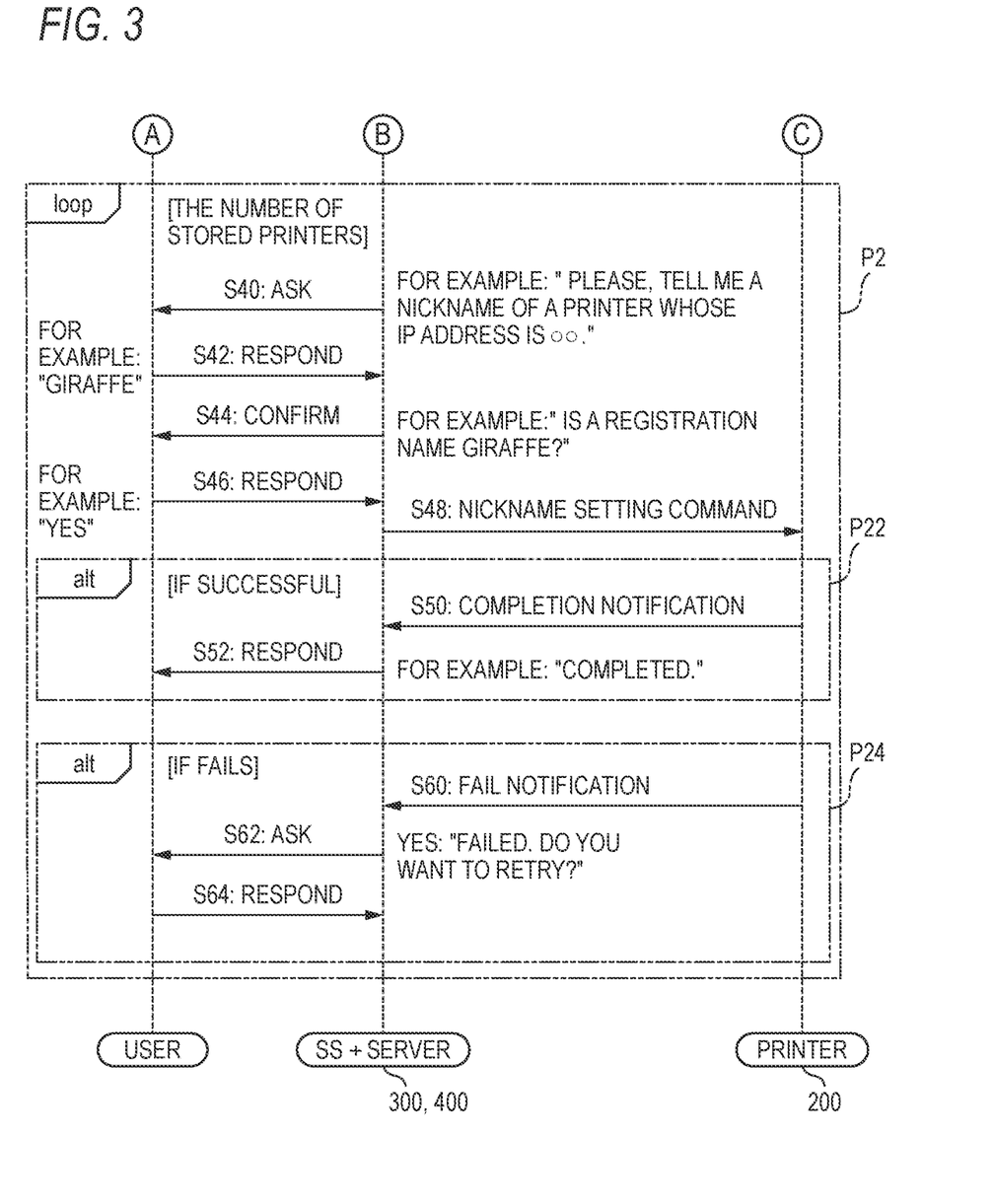
FIG. 3 is a sequence diagram continuing to the sequence diagram shown in FIG. 2.

FIGS. 2 and 3 depict a sequence of nickname registering processing that is executed by the image forming system 1000. The nickname registering processing is processing in which the smart speaker 300 and the application server 400 cooperate with each other to register a nickname on the printer 200.

In FIG. 2, the user utters in S2. Since the user wants to assign a nickname to a printer (including the printer 200) communicatively connected to the smart speaker 300, the user instructs the smart speaker 300 "Register a nickname on the printer," for example. The nickname registering processing starts when the smart speaker 300 detects the uttered voice.

Figure 4:
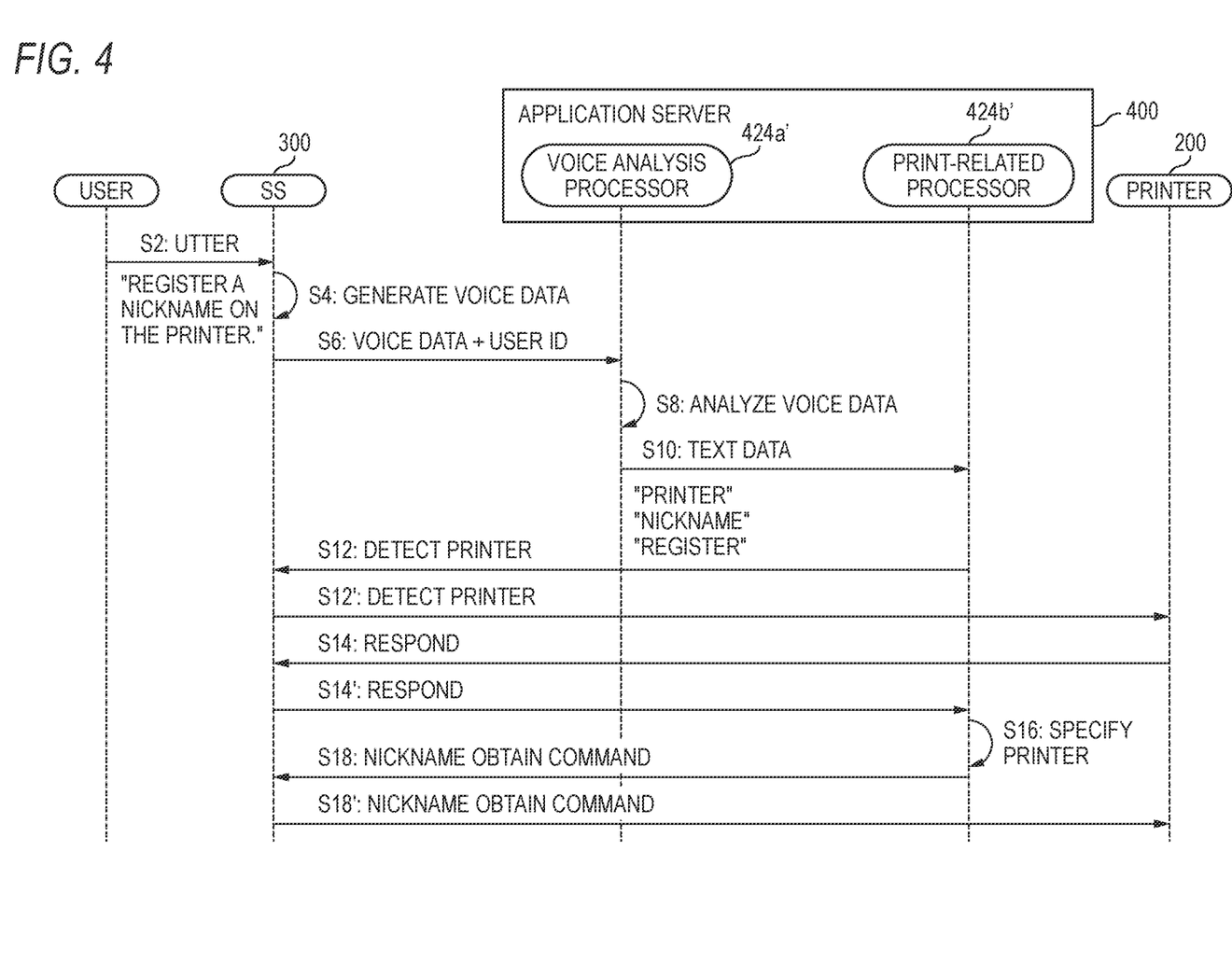
FIG. 4 is a sequence diagram depicting detailed procedures of some of the nickname registering processing shown in FIG. 2.

FIG. 4 depicts a sequence including processing that is omitted between S2 and S18 shown in FIG. 2. Since S2 in FIG. 4 is the same as S2 in FIG. 2, the description thereof is omitted.

In S4, the smart speaker 300 generates voice data indicative of the voice uttered by the user. That is, when the voice "Register a nickname on the printer," is input to the smart speaker 300, the smart speaker 300 generates voice data indicative of the voice.

Then, in S6, the smart speaker 300 transmits the voice data and a registered user ID to the voice analysis processor 424a' of the application server 400. The voice data is transmitted using a well-known protocol, for example, HTTP (abbreviation of Hyper Text Transfer Protocol). Note that, the smart speaker 300 can register a voiceprint of the user. The smart speaker 300 performs voiceprint recognition, based on the input voice, and transmits the user ID when the recognized voiceprint coincides with the registered voiceprint. Therefore, when the user ID is transmitted from the smart speaker 300, the voiceprint recognition has been already performed in the previous stage.

When the application server 400 receives the voice data and the user ID, in S8, the voice analysis processor 424a' of the application server 400 analyzes the received voice data. Specifically, the voice analysis processor 424a' executes the voice recognition processing on the voice data to generate text data indicative of the voice indicated by the voice data. For example, when the voice data indicating the voice "Register a nickname on the printer," is received, the voice analysis processor 424a' generates text data indicative of a content of the voice. The voice analysis processor 424a' further executes the morpheme analysis processing on the text data. Thereby, from the generated text data, for example, words such as "printer", "nickname" and "Register" are extracted and types (for example, noun and verb) of parts of speech of the words are specified. The voice analysis processor 424a' generates a list in which the extracted words are associated with the types of parts of speech, as a morpheme analysis result.

Then, in S10, the voice analysis processor 424a' transfers the generated text data, the morpheme analysis result, and the user ID received from the smart speaker 300 to the print-related processor 424b'. Specifically, the voice analysis processor 424a' stores the text data, the morpheme analysis result and the user ID in a predetermined area of the data storage area 422, for example, and calls the print-related program 424b.

When the text data, the morpheme analysis result and the user ID are received from the voice analysis processor 424a', in S12, the print-related processor 424b' executes processing of detecting printers capable of communicating with the smart speaker 300. Specifically, the print-related processor 424b' transmits a request for polling to the smart speaker 300. The smart speaker 300 transmits the received request to the communicable device, as it is, in S12'. In the system configuration shown in FIG. 1, the device capable of communicating with the smart speaker 300 is only the printer 200. Therefore, the smart speaker 300 transmits the received request to the printer 200, as it is.

In response to this, the printer 200 transmits a response to the request to the smart speaker 300, in S14. The smart speaker 300 transmits the response received from the printer 200 to the print-related processor 424b' of the application server 400, as it is, in S14'. In a case where there is a plurality of devices capable of communicating with the smart speaker 300, the print-related processor 424b' receives responses corresponding to the number of the devices. Therefore, in S16, the print-related processor 424b' specifies one device to which a nickname obtain command is to be transmitted, from the devices.

Then, in S18, the print-related processor 424b' transmits a nickname obtain command whose destination is the one specified device, in the present illustrative embodiment, the printer 200 to the smart speaker 300. The smart speaker 300 transmits the received nickname obtain command to the printer 200, as it is, in S18'.

Like this, the data transmission and reception between the smart speaker 300 and the application server 400 are complicated. Therefore, in the below, assuming that the smart speaker 300 and the application server 400 are integrated, the processing that is executed by the smart speaker 300 and the application server 400 in cooperation with each other is described as processing that is executed by the smart speaker 300.

In FIG. 2, loop processing P1 indicates processing of generating the nickname table 422a. Specifically, for the printer that responded in S14, i.e., each of the detected printers is inquired whether a nickname is registered, and for the printer that responded that a nickname is registered, the nickname and the device specifying information are stored in association with each other in the nickname table 422a (P12). On the other hand, for the printer that responded that a nickname is not registered, only the device specifying information is stored in the nickname table 422a (P13). Note that, in a case where all of the detected printers are registered in the nickname table 422a, the nickname registering processing is over (P14).

The smart speaker 300 transmits a nickname obtain command to the specified printer, in S18. Then, in S20, if the specified printer has a registered nickname, the specified printer responds with the registered nickname. However, if the specified printer does not have a registered nickname, the specified printer responds that a nickname is not registered.

Then, in S22, the smart speaker 300 transmits a device specifying information obtain command to the specified printer. In response to this, the specified printer responds with its own device specifying information, in S24. The device specifying information is information for specifying a device, such as an IP address, a MAC address, a model name, a node name and the like, and is different from the nickname. Note that, the device specifying information is stored in the storage area 210a for a nickname and the like of the printer 200.

Then, for the printer that responded with the nickname in S20, the smart speaker 300 associates and stores the nickname and the device specifying information in the nickname table 422a in S30 (P12). On the other hand, for the printer that responded that a nickname is not registered, in S20, the smart speaker 300 stores the device specifying information in the nickname table 422a in S32 (P13).

The processing of S18 to S30 or S32 is executed for each of the detected printers. Thereby, when the nickname table 422a is all filled, i.e., when the nickname table 422a in which the nickname and the device specifying information are associated with each other is generated for all the detected printers, the smart speaker 300 responds with voice "There is no unregistered printer," for example, in S34 in the processing P14, and ends the nickname registering processing.

On the other hand, when even a part of the nickname table 422a is not filled, the smart speaker 300 generates voice "There are n nickname unregistered printer(s)," for example, in S36 and provides the user with the number of nickname unregistered printers.

In FIG. 3, loop processing P2 indicates processing of registering a nickname on each of the nickname unregistered printers. In cases where the registration of the nickname is successful (P22) and fails (P24), the smart speaker 300 changes response methods.

The smart speaker 300 specifies any one of the nickname unregistered printers, and in S40, asks the user by generating voice "Please, tell me a nickname of a printer whose IP address is ○○," for example. In response to this, when the user utters "giraffe", for example, in S42, the smart speaker 300 generates voice "Is a registration name giraffe?", for example, for confirmation with the user, in S44. Note that, in S40, an IP address is used as the device specifying information. However, the present disclosure is not limited thereto. For example, any information such as a MAC address, a model name, a node name and the like may also be used. In addition, as the device specifying information, not only one type but also a plurality of types may be presented together. For example, the smart speaker may ask the user by presenting a node name as well as an IP address, for example, generating voice "Please tell me a nickname of a printer whose IP address is ○○ and node name is ΔΔ".

When the user responds by pronouncing "Yes" in S46, for example, the smart speaker 300 transmits a nickname setting command to the specified printer, in S48. The printer that receives the nickname setting command registers the nickname indicated by the nickname setting command in the storage. When the printer that receives the nickname setting command succeeds in registration of the nickname, the printer transmits a completion notification to the smart speaker 300, in S50. Therefore, the smart speaker 300 responds to the user by generating voice "Completed", for example, in S52 (P22).

On the other hand, when the printer that receives the nickname setting command fails in the registration of the nickname, the printer transmits a fail notification to the smart speaker 300, in S60. Therefore, in S62, the smart speaker 300 asks the user by generating voice "Failed. Do you want to retry?", for example. In response to this, the user pronounces and responds in S64. When the response is "Yes", the smart speaker 300 returns to S40, and again performs the registration of the nickname. On the other hand, when the response is "No", the smart speaker 300 specifies a next printer and performs the processing of S40 for the printer (P24).

In a case where the user responds "giraffe" in S42, "giraffe" may have been already registered on another printer. At this time, the smart speaker 300 again asks the user by generating voice "The nickname is already used. Please tell me another nickname," for example.

Also, in S46, the user may respond "No". In this case, the smart speaker 300 starts over from the question in S40.

When the processing of S40 to P22 or P24 is executed for each of the nickname unregistered printers, the nickname registering processing is over. Thereby, the nickname table 422a is all filled. In this way, in the present illustrative embodiment, for the nickname unregistered printer, the nickname registering processing is executed. However, when changing a nickname of the nickname registered printer, the nickname can be changed by the similar control. In this case, for example, when the user utters "Change the nickname from giraffe to elephant", a device whose nickname is "giraffe" is specified and the nickname setting command "elephant" in S48 is transmitted to the specified device, so that the nickname is changed. Similarly, when the user utters "Delete the nickname 'giraffe'", the nickname of the specified device can also be deleted. The registration, change and deletion of the nickname may be performed for each of users. For example, the registration, change and deletion of the nickname may be performed for each of the user ID in S6 of FIG. 4. Thereby, it is possible to prevent the nickname from being unintentionally changed and deleted by another user.

Figure 5A:
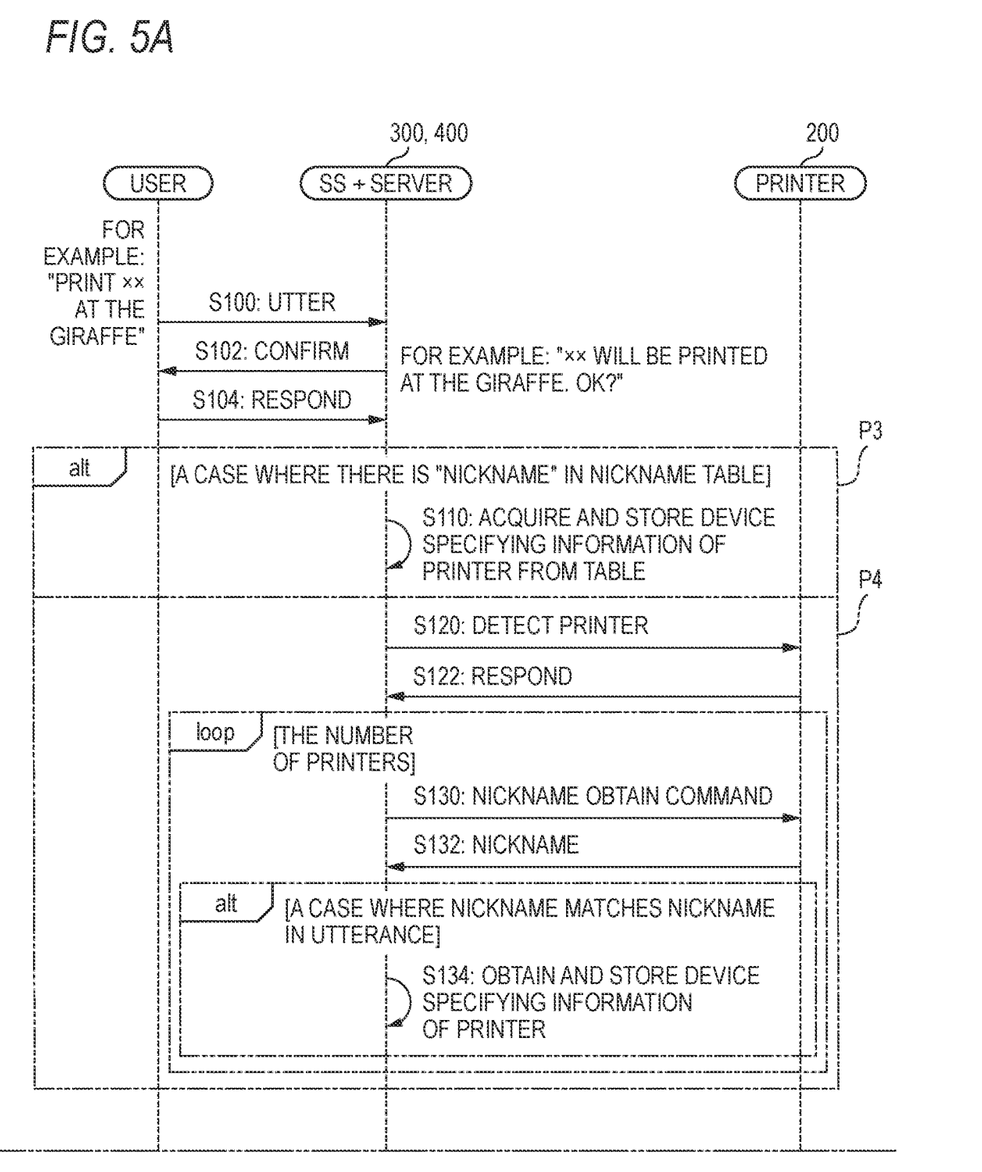
FIGS. 5A and 5B are sequence diagrams of print control processing that is executed by the image forming system shown in FIG. 1.
Figure 5B:
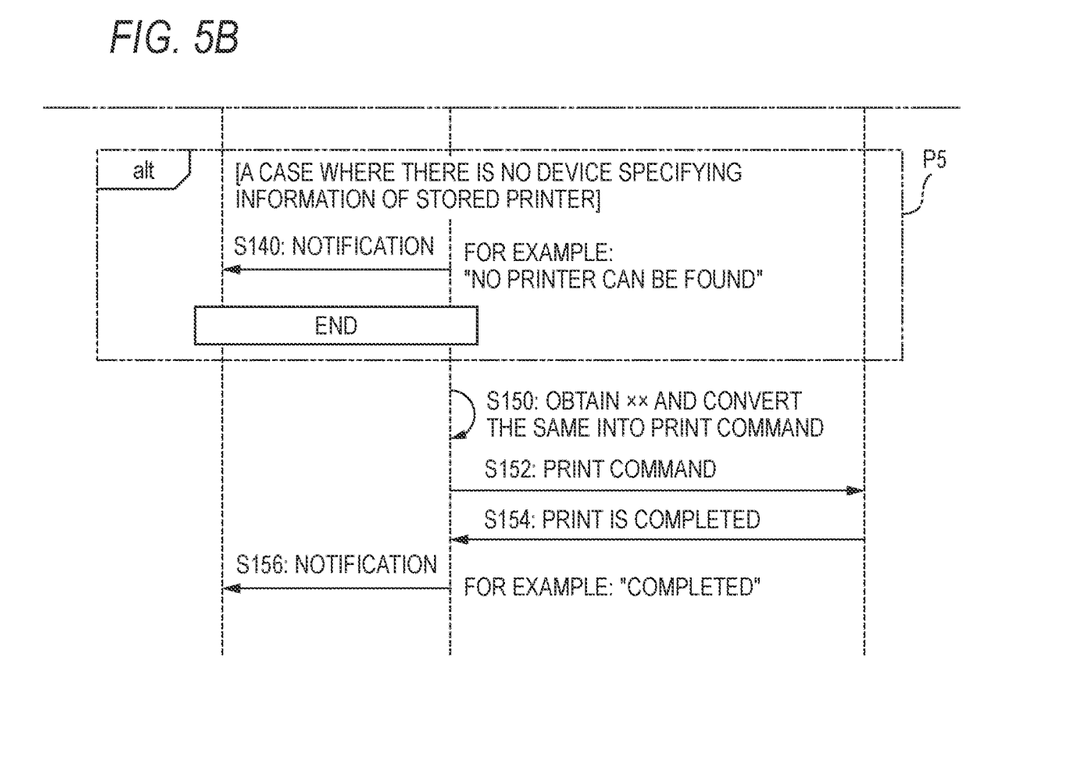

FIGS. 5A and 5B depict a sequence of print control processing in which a nickname is used. In FIG. 5A, the user utters in S100. Since the user wants a printer with a nickname to perform printing, the user instructs the smart speaker 300 "Print xx at the giraffe", for example. The print control processing starts when the smart speaker 300 detects the uttered voice.

Then, in S102, the smart speaker 300 generates voice, "xx will be printed at the giraffe. OK?", for example, for confirmation with the user. In response to this, the user pronounces and responds in S104. When the response is "Yes", the smart speaker 300 proceeds to next processing P3 or P4. On the other hand, when the response is "No", the smart speaker 300 ends the print control processing.

The processing P3 is processing that is executed when the nickname in utterance is registered in the nickname table 422a. On the other hand, the processing P4 is processing that is executed when the nickname in utterance is not registered in the nickname table 422a.

In S110 of the processing P3, the smart speaker 300 reads out and obtains the device specifying information of the printer associated with the nickname in utterance from the nickname table 422a, and stores temporarily the same in the data storage area 422, for example.

In S120 and S122 of the processing P4, the smart speaker 300 executes processing similar to S12 and S14 (see FIG. 2). Then, the smart speaker 300 executes processing similar to S18 and S20 (see FIG. 2), in S130 and S132. Then, the smart speaker 300 repeats the processing of S130 and S132 until a nickname matching the nickname in utterance is responded. When a nickname matching the nickname in utterance is responded, the smart speaker 300 obtains the device specifying information of the printer that returns the nickname, and stores temporarily the same in the data storage area 422, in S134.

Then, the smart speaker 300 determines whether the device specifying information is stored in the data storage area 422. When it is determined that the device specifying information is not stored, the smart speaker 300 executes processing P5, and in S140, generates voice "No printer can be found," for example, and notifies the same to the user. Then, the smart speaker 300 ends the print control processing.

On the other hand, when it is determined that the device specifying information is stored, the smart speaker 300 obtains "xx" and converts the same into a print command, in S150. Then, the smart speaker 300 transmits the converted print command to the printer, for example, the printer 200 indicated by the stored device specifying information, in S152.

In response to this, when the printer 200 completes the print of "xx" and transmits a completion notification to the smart speaker 300, in S154, the smart speaker 300 generates voice "Completed," for example, and notifies the same to the user, in S156.

In this way, the user can cause the printer 200 having the nickname assigned thereto to perform printing simply by calling the nickname.

Note that, in the present illustrative embodiment, when registering a nickname on a device capable of communicating with the smart speaker 300, including the printer 200, the user registers the nickname on each device by using voice. However, the present disclosure is not limited thereto. For example, a nickname can be registered on a device without using voice as long as the device can register a nickname, can directly communicate with a terminal device such as a smartphone and a PC, which is not included in the image forming system 1000, and can register/change a nickname via the terminal device. Specifically, most of image forming apparatuses including the printer 200 have an EWS. Therefore, when an image forming apparatus having the EWS is configured to register/change a nickname, it is possible to register a nickname on the image forming apparatus by using the EWS. Note that, EWS is an abbreviation of embedded Web server.

Also, in the present illustrative embodiment, the printer including the printer 200 has been exemplified as the device capable of communicating with the smart speaker 300. However, the type of the device is not limited to the printer. For example, image forming apparatuses of other types are also possible and a variety of electronic devices different from the image forming apparatus, such as a cleaner and a television, are also possible.

Also, in the present illustrative embodiment, the diverse information is notified to the user by voice. However, the present disclosure is not limited thereto. For example, the notification can be performed by display. Specifically, in a case where the smart speaker 300 includes a display, the diverse information may be displayed on the display by characters.

As described above, the application server 400 of the present illustrative embodiment includes the voice input/output interface, the network IF 480, and the CPU 410. The application server 400 is an application server 400 that can connect to the smart speaker 300 via the network IF 480, and the CPU 410 executes instruction receiving processing (S2) of receiving a user's instruction for registering a nickname on the printer 200, specifying processing (S16) of specifying the printer 200 on which the nickname is to be registered, nickname registering processing (P2) of communicating with the specified printer 200 via the network IF 480 so that the nickname is registered on the printer 200 specified in the specifying processing, voice instruction recognition processing (P3) of recognizing a content of a voice instruction that is input from the smart speaker 300 by pronunciation of an utterer, and voice instruction execution processing (S152) of, when a content of the voice instruction recognized in the voice instruction recognition processing includes the registered nickname, performing an operation corresponding to the recognized voice instruction on the printer 200 corresponding to the registered nickname.

In this way, according to the application server 400 of the present illustrative embodiment, it is possible to exclude a troublesome operation and to make it easy to assign the same nickname to the same device and to instruct an operation with a plurality of types of smart speakers.

For your information, in the present illustrative embodiment, the application server 400 is an example of the "information processing apparatus". The network IF 480 is an example of the "voice input/output interface" and the "communication interface". The smart speaker 300 is an example of the "microphone and speaker". The CPU 410 is an example of the "controller". The printer 200 is an example of the "electronic device".

Also, the application server 400 further includes the storage 420. When information indicating that a nickname is already registered is received from the printer 200, the CPU 410 executes storing processing (S30) of associating and storing the device specifying information of the specified printer 200 and the registered nickname in the storage 420, as a nickname registered device. Thereby, in a case where a nickname is included in the content of the voice instruction, it is possible to promptly specify which printer the nickname-assigned printer 200 is, from the device specifying information. For your information, the storage 420 is an example of the "storage".

Also, in the storing processing, when information indicating that a nickname is not registered yet is received from the printer 200, the CPU 410 stores the device specifying information of the specified printer 200 in the storage 420, as a nickname unregistered device (S32). Thereby, it is possible to know which the nickname unregistered device is without a search, which is convenient.

Also, in a case where the nickname unregistered device is stored in the storage 420, the CPU 410 executes notification processing (S40) of prompting the user to name the nickname. Thereby, the user can assign a nickname to the nickname unregistered device.

Also, in the notification processing, voice is generated from the smart speaker 300, as the notification to prompt naming of the nickname. When an utterer pronounces a nickname, in response to the generation of the voice as the notification from the smart speaker 300, the CPU 410 recognizes the pronounced nickname in the voice instruction recognition processing, communicates with the nickname unregistered device in the nickname registering processing so as to register the recognized nickname, and associates and stores the recognized nickname and device specifying information of specifying the nickname unregistered device as a nickname registered device in the storage 420 in the storing processing (P2). Thereby, the user can change and register the nickname unregistered device to the nickname registered device simply by pronouncing the nickname, which is convenient.

Also, in the notification processing, in a case where the recognized nickname is already stored as a nickname of another printer in the storage 420, the CPU 410 notifies the user that the recognized nickname is already used in another printer. Thereby, it is possible to prevent duplicate registration of the nickname.

Also, in the notification processing, in a case where the recognized nickname is stored in the storage 420, the CPU 410 notifies the user that the registration of the nickname on the printer 200 is completed (S52). Thereby, the user can know that the registration of the nickname is completed, which is convenient.

Also, in a case where the content of the voice recognized in the voice instruction recognition processing is a content of calling a nickname and instructing an operation and the called nickname is not stored in the storage 420, the CPU 410 executes search processing of searching for the printer 200 on which the called nickname is registered from a plurality of printers connected via the communication interface, and instructs the printer 200 detected in the search processing to perform the instructed operation in the voice instruction execution processing, via the communication interface (P4). Thereby, even though a nickname called by the user is not stored in the storage 420, the nickname is automatically searched for, which is convenient.

Also, when the printer 200 is not detected by the search processing, the CPU 410 notifies the user that the printer 200 on which the called nickname is registered is not detected (P5). Thereby, the user can know that the called nickname is not registered, which is convenient.

Note that, the present invention is not limited to the above-described illustrative embodiment, and can be diversely changed without departing from the gist thereof.

(1) In the above illustrative embodiment, the processing of analyzing the voice data is executed by the voice analysis processor 424a' of the application server 400. Instead, some or all of the processing of analyzing the voice data may also be executed by the smart speaker 300. Some or all of the processing of analyzing the voice data may also be executed by the print-related processor 424b'. For example, the voice analysis processor 424a' may execute only the processing of executing the voice recognition processing to generate the text data, and the print-related processor 424b' may execute the morpheme analysis processing of extracting words. Some or all of the processing such as nickname registration that is executed by the application server 400 may also be executed by the smart speaker 300 or by an information terminal (not shown) such as a smartphone capable of communicating with the smart speaker 300.

(2) The application server 400 is a cloud server but may also be a local server that is connected to the LAN 70 and is not connected to the Internet 80. In this case, only the voice data may be transmitted without transmitting the identification information such as a user ID from the smart speaker 300 to the application server 400.

(3) The interface for connecting the smart speaker 300 and the printer 200 each other is not limited to the Bluetooth IF 260. For example, interfaces such as a wireless LAN, a wired LAN, a USB and the like may also be possible.

(4) In the above illustrative embodiment, some of configurations implemented by hardware may be replaced with software. To the contrary, some of configurations implemented by software may be replaced with hardware.

What is claimed is:

1. An information processing apparatus comprising:
a voice input/output interface;
a communication interface, the information processing apparatus being connectable to a microphone and a speaker via the voice input/output interface;
a storage; and
a controller configured to:
receive a user's instruction for registering a nickname on an electronic device;
specify the electronic device on which the nickname is to be registered;
receive information from the specified electronic device through communicating with the specified electronic device via the communication interface;
based on the received information, register the nickname on a storage area of the specified electronic device and associate and store device specifying information of the specified electronic device and the registered nickname in the storage of the information processing apparatus;
recognize a content of a voice instruction from an utterer's pronunciation received by the microphone; and
in a case the recognized content of the voice instruction includes the registered nickname, cause the electronic device corresponding to the registered nickname to perform an operation corresponding to the recognized voice instruction.

2. The information processing apparatus according to claim 1,
wherein in a case the received information from the specified electronic device indicates that the nickname is already register, the controller is configured to associate and store device specifying information of the specified electronic device and the registered nickname in the storage, as a nickname registered device.

3. The information processing apparatus according to claim 2, wherein in the associating and storing, in a case the received information from the specified electronic device indicates that the nickname is not registered yet, the controller is configured to store the device specifying information of the specified electronic device in the storage, as a nickname unregistered device.

4. The information processing apparatus according to claim 3, wherein in a case the nickname unregistered device is stored in the storage, the controller is configured to perform notification to prompt a user to name the nickname.

5. The information processing apparatus according to claim 4, wherein the controller is configured to:
in the performing of the notification, cause the speaker to generate voice as a notification to prompt naming of the nickname; and
in a case receiving a nickname pronounced from the utterer in response to the generation of the voice as the notification from the speaker,
in the recognition of the content, recognize the pronounced nickname,
in the registration of the nickname, communicates with the nickname unregistered device to register the recognized nickname, and
in the associating and storing, associate and store the recognized nickname and device specifying information of specifying the nickname unregistered device in the storage, as the nickname registered device.

6. The information processing apparatus according to claim 4, wherein in the performing of the notification, in a case the recognized nickname is already stored in the storage as a nickname of a second electronic device, the controller is configured to notify the user that the recognized nickname is already used in the second electronic device, the second electronic device being another electronic device than the specified electronic device.

7. The information processing apparatus according to claim 4, wherein in the performing of the notification, the controller is configured to notify the user that registration of the nickname on the electronic device is completed based on storing the recognized nickname in the storage.

8. The information processing apparatus according to claim 3, wherein in a case the recognized content of the voice includes a content of calling a nickname and instructing an operation and the called nickname is not stored in the storage, the controller is configured to:
search for an electronic device with the called nickname being registered from a plurality of electronic devices connected via the communication interface; and
in the performing of the operation, instruct, via the communication interface, the searched electronic device to perform the instructed operation.

9. The information processing apparatus according to claim 8, wherein in a case the electronic device is not detected in the searching, the controller is configured to notify the user that the electronic device with the called nickname being registered is not detected.

10. The information processing apparatus according to claim 1,
wherein the storage stores a nickname table, and
wherein in the registering, the controller is configured to, based on the received information, associate and store the device specifying information of the specified electronic device and the registered nickname in the nickname table.

11. An information processing method using an information processing apparatus, the information processing apparatus comprising a voice input/output interface, a communication interface, and a storage and being connectable to a microphone and a speaker via the voice input/output interface, the information processing method comprising:
receiving a user's instruction for registering a nickname on an electronic device;
specifying the electronic device on which the nickname is to be registered;
receiving information from the specified electronic device through communicating with the specified electronic device via the communication interface;
based on the received information, registering the nickname on a storage area of the specified electronic device and associating and storing device specifying information of the specified electronic device and the registered nickname in the storage of the information processing apparatus;
recognizing a content of a voice instruction from an utterer's pronunciation received by the microphone, and
in a case the recognized content of the voice instruction includes the registered nickname, causing the electronic device corresponding to the registered nickname to perform an operation corresponding to the recognized voice instruction.

12. An electronic device comprising:
a storage;
a print mechanism configured to form an image on a medium;
a communication interface; and
a controller configured to:
   store a device name of the electronic device in the storage;
   based on receiving a nickname transmission request from a smart speaker via the communication interface, in a case a nickname different from the device name is stored in the storage, read out the nickname from the storage and transmit the nickname from the communication interface;
   based on receiving a nickname registration request via the communication interface, register a nickname indicated by the nickname registration request in the storage; and
   based on receiving instruction from the smart speaker, the instruction including the registered nickname and image forming instruction recognized by the smart speaker from a voice instruction, control the print mechanism to perform image forming corresponding to the recognized voice instruction.

13. An information processing system comprising an information processing apparatus and an electronic device and configured to transmit and receive information between the information processing apparatus and the electronic device,
   the information processing apparatus comprising:
      a voice input/output interface;
      a communication interface;
      a storage; and
      a controller,
      the information processing apparatus being connectable to a microphone and a speaker via the voice input/output interface,
      the controller being configured to:
         receive a user's instruction for registering a nickname on the electronic device;
         specify the electronic device on which the nickname is to be registered;
         receive information from the specified electronic device through communicating with the specified electronic device via the communication interface;
         based on the received information, associate and store device specifying information of the specified electronic device and the registered nickname in the storage of the information processing apparatus;
         recognize a content of a voice instruction from an utterer's pronunciation received by the microphone; and
         in a case the recognized content of the voice instruction includes the registered nickname, cause the electronic device corresponding to the registered nickname to perform an operation corresponding to the recognized voice instruction, and
   the electronic device comprising:
      a storage;
      a communication interface; and
      a controller configured to:
         based on communicating with the information processing apparatus via the communication interface to register the nickname, register the nickname in the storage of the electronic device; and
         in the case the recognized content of the voice instruction includes the registered nickname, perform the operation corresponding to the recognized voice instruction.

* * * * *